Figure 1:
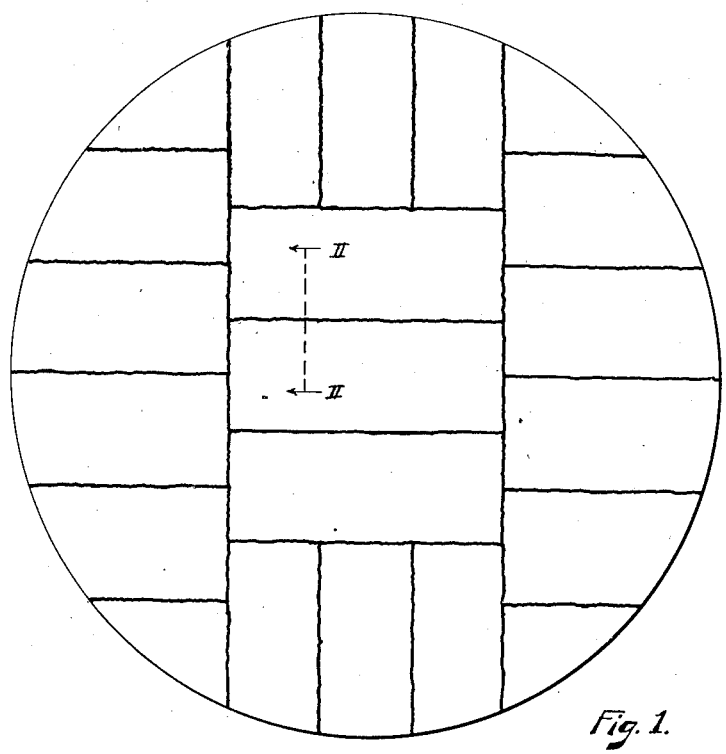

March 8, 1927.

G. O. CARTER 1,620,324

WELDED STRUCTURE AND PROCESS OF MAKING SAME

Filed April 28, 1924

Glenn Owen Carter
INVENTOR

BY
ATTORNEYS

Patented Mar. 8, 1927.

1,620,324

UNITED STATES PATENT OFFICE.

GLENN OWEN CARTER, OF NEW ROCHELLE, NEW YORK, ASSIGNOR TO THE LINDE AIR PRODUCTS COMPANY, A CORPORATION OF OHIO.

WELDED STRUCTURE AND PROCESS OF MAKING SAME.

Application filed April 28, 1924. Serial No. 709,690.

It is well known to those skilled in the art of high-temperature welding of steel and iron, involving for example the use of the oxy-acetylene flame or of the electric arc, that serious difficulties are encountered in the building of such welded structures, as for example gas-holders or oil-tanks and the like, as present highly extended plane or curved surfaces. These difficulties take the form of a distortion of the surfaces, which is traceable to the stresses arising from the very high local temperatures incident to the welding operation, which stresses are, so to speak, locked up in the structure and manifest themselves in the form of buckled areas, often of very large extent.

According to the present invention these stresses, and the resultant distortion, are avoided or minimized first, by reducing the stresses, and second, by providing a relatively plastic weld which is capable of absorbing, wholly or largely, such stresses as are produced in the structure. By the conjoint use of these expedients I am able to produce welded structures presenting extended surfaces but free from substantial distortion. So far as I am aware this is a new result in this art.

In all such welding operations where steel or iron plates or shapes are to be joined by welding their contiguous edges, which term is used herein to include lapping edges, it has been the prior practice to employ steel or alloy steels as the weld material, supplied in the form of a welding-rod to the oxy-acetylene flame or electric arc. This necessitates the bringing of the contiguous edges of the plates to the full welding temperature, which is substantially the fusion temperature of the metal. Since steel and iron are relatively good conductors of heat it follows that the plates are highly heated for a considerable distance from the edges to be welded, with the necessary result that severe stresses are set up in the plates and in the welded structure as a whole, with resultant twisting and warping.

I minimize these stresses by substituting for the steel or alloy steel weld metal, a non-ferrous alloy which has a much lower melting point than steel, and which unites strongly with the steel or iron at temperatures much below the melting point, or usual welding temperature, of the latter. Since the actual temperatures developed at the joint are lower, the useless heating of the plates, as well as the area over which such plates are heated, is correspondingly lessened; and the structure as a whole is subjected to far less warping stress.

I further improve the welded structure by the choice of a weld-metal of higher plasticity than the steels or alloy steels heretofore used; that is to say, a weld-metal having the property of distorting or yielding at a lower unit load than the steel being welded, or than the steel or alloy steel weld-metals heretofore used, coupled with sufficient plasticity to absorb the amount of strain set up by the welding process. I have found that if the plasticity of the weld-metal is sufficiently high, and if a sufficient quantity of the weld-metal is supplied to the joint, such stresses as may be set up in the plates under the low temperature welding conditions mentioned above will be substantially transferred to and absorbed by the weld-metal, with the result that the welded structure as a whole is substantially free from the distortion usually arising from the welding operation.

It will be understood from the foregoing that it is essential not only to provide a weld-metal of the proper physical characteristics (melting point, plasticity or ability to yield under stress, adherence to the steel, etc.) but to provide this weld-metal in sufficient quantity to absorb a substantial proportion or all of the stresses set up in the structure. For this purpose a mere film of metal between contacting surfaces, such as is used in contact brazing operations, is not sufficient; but the present invention contemplates the use of substantial quantities of added weld-metal, fused into place, being similar in this respect to the present practice of welding steel plates or shapes with steel or alloy-steel welding rods.

I have found that the above several requirements for a weld-metal for the purpose described, to wit, a low melting point as compared with the steels or alloy steels heretofore used; strong adherence to iron and steel; and sufficient plasticity to absorb most of the strains set up in the plates; are possessed by certain of the known bronzes, including Tobin bronze and manganese bronze. My invention however contemplates the use of any non-ferrous weld-metal having the above essential characteristics. It will be understood of course that the application of these non-ferrous weld-metals requires a proper preparation of the iron or steel surfaces, as by "tinning", as in ordinary contact brazing.

I regard it as essential to the practice of my invention in its preferred embodiment that the weld-metal should be applied through the agency of a high-temperature source of heat, such as the oxy-acetylene flame or electric arc. While it is true that temperatures sufficient for melting certain bronzes and producing a joint therewith between steel plates may be attained by the use of ordinary gas-air or gas-oxygen flames, the time during which the flame must be applied is such that the total quantity of heat imparted to the plates is not very much less than when the plates are welded by a steel or alloy steel weld-metal in conjunction with a high-temperature source of heat; nor is the liability to warping and distortion greatly reduced. According to my invention in its preferred embodiment therefore, I apply the non-ferrous weld-metal rapidly by means of a high-temperature source of heat, and preferably by means of the oxy-acetylene flame, causing the latter to traverse the work with great rapidity (relative to the usual practice of welding with steel or alloy steel filler-rods) and under such conditions that the temperature at any point does not rise substantially above the melting point, or the proper operating temperature, for the non-ferrous weld-metal used. In this way the useless dissipation of heat into the plates or shapes is minimized, as are also the stresses set up in the structure, as explained above.

Figure 2:
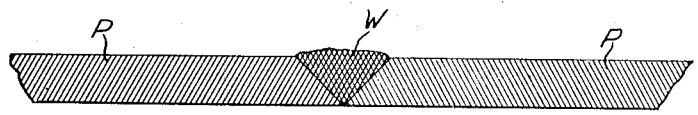
Figure 3:
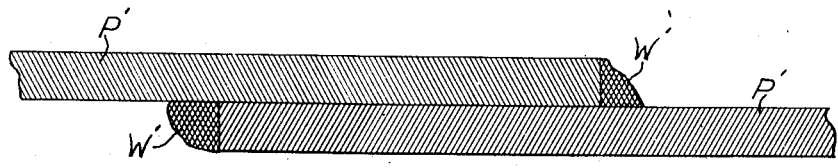

The accompanying drawing discloses one of numerous possible embodiments of my invention. Fig. 1 thereof illustrates a built-up multi-plate structure, such as a bottom for a gas-holder, oil tank or the like, having its plates welded together into a unitary flat structure in accordance with my invention; Fig. 2 is an enlarged sectional view on the line II—II of Fig. 1, illustrating two steel plates P, P welded edge to edge by a substantial deposit of non-ferrous metal W having a lower melting point and higher plasticity than steel, as described; and Fig. 3 illustrates lapping steel plates P', P' of a similar multi-plate structure united by welds W', W' consisting of substantial quantities of non-ferrous metal, in accordance with this invention.

I am aware that welding or brazing with non-ferrous alloys has been heretofore used in conjunction with malleable castings; but in such cases the purpose as well as the practice was of quite a different nature, the object being to avoid such heating of the malleable castings as would bring about their transformation to the non-malleable state. In such cases a steel or alloy steel weld-metal could not be applied without injurious or destructive effect, and recourse was therefore necessarily had to lower melting alloys. In the present case, on the contrary, excellent joints may be made by the use of steel or alloy steel welding-rods without injury to the metal, and the purpose of using a lower melting alloy, in conjunction with a high temperature source of heat, and the manner of its use, is as explained above to minimize the distorting stresses in the plates on the one hand, and on the other hand to absorb in the material of a highly plastic weld-metal, such distorting stresses as are unavoidable.

For clearness of understanding of the actual nature of the invention I have preferred to describe the present operation as "welding" even though a non-ferrous weld-metal is used, and the operation might on that account be considered as brazing. The technique however, in accordance with the present invention, is that of high-temperature welding, and the terminology of that art is therefore more appropriate.

My invention is not restricted to any particular method of applying the weld metal. Hand torches of the usual oxy-acetylene type may be used, but the welding and melting characteristics of the non-ferrous alloys are such as to lend themselves particularly to automatic and machine operations, both of the oxy-acetylene and electric welding types.

I claim:

1. Process of forming built-up structures comprising steel plates or shapes, consisting in uniting contiguous edges of the same by means of a substantial quantity of non-ferrous metal having a lower melting point and higher plasticity than steel, said non-ferrous metal being rapidly fused into place by application of a high-temperature source of heat, whereby distorting stresses in the structure are avoided or minimized.

2. A built-up structure comprising steel plates or shapes, the contiguous edges of which are united by means of a substantial quantity of non-ferrous metal having a lower melting point and higher plasticity than steel, said structure substantially free from distorting stresses.

3. Process of forming built-up structures comprising steel plates, which consists in depositing a substantial quantity of non-ferrous metal successively along contiguous edges of such plates to unite the same, said non-ferrous metal having a lower melting point and higher plasticity than steel and being rapidly fused into place by the application of a high-temperature source of heat, whereby distorting stresses in the structure are avoided or minimized.

In testimony whereof, I affix my signature.

GLENN O. CARTER.